(12) United States Patent
Hillenbrand

(10) Patent No.: US 9,843,240 B2
(45) Date of Patent: Dec. 12, 2017

(54) BREATHING ELECTRIC MOTOR

(71) Applicant: BROSE FAHRZEUGTEILE GMBH & CO. KOMMANDITGESELLSCHAFT, WUERZBURG, Weurzburg (DE)

(72) Inventor: Tobias Hillenbrand, Volkach (DE)

(73) Assignee: Brose Fahrzeugteile GmbH & Co. Kommanditgesellschaft, Wuerzburg, Wuerzburg (DE)

(\*) Notice: Subject to any disclaimer, the term of this patent is extended or adjusted under 35 U.S.C. 154(b) by 364 days.

(21) Appl. No.: 14/206,206

(22) Filed: Mar. 12, 2014

(65) Prior Publication Data
US 2014/0191623 A1    Jul. 10, 2014

Related U.S. Application Data

(63) Continuation of application No. PCT/EP2012/003575, filed on Aug. 24, 2012.

(30) Foreign Application Priority Data

Sep. 12, 2011  (DE) .............. 10 2011 115 455

(51) Int. Cl.
*H02K 9/06* (2006.01)
*H02K 1/32* (2006.01)
(Continued)

(52) U.S. Cl.
CPC ............... *H02K 9/06* (2013.01); *H02K 1/22* (2013.01); *H02K 3/522* (2013.01); *H02K 5/10* (2013.01);
(Continued)

(58) Field of Classification Search
CPC ...... H02K 1/27; H02K 1/2706; H02K 1/2793; H02K 1/32; H02K 1/325; H02K 9/04;
(Continued)

(56) References Cited

U.S. PATENT DOCUMENTS 1,687,513 A \* 10/1928 Reist ............... H02K 1/30
                                            310/269
3,193,185 A \* 7/1965 Erwin ............... F01D 5/145
                                            415/193
(Continued)

FOREIGN PATENT DOCUMENTS

DE          470020 C    1/1929
DE         4242132 A1   6/1994
(Continued)

*Primary Examiner* — Joshua Benitez Rosario
*Assistant Examiner* — Alexander Moraza
(74) *Attorney, Agent, or Firm* — Laurence A. Greenberg; Werner H. Stemer; Ralph E. Locher

(57) ABSTRACT

An electric motor has efficient self-cooling. The electric motor contains a rotor that is rotatably mounted with respect to a stator. On a first sub-segment of an end face of the rotor, a first air-guiding contour is formed that, during rotation of the rotor in a reference rotation direction, generates an outwardly directed air flow. On a second sub-segment of the same end face, a second air-guide contour is formed that, during rotation of the rotor in a reference rotation direction, generates an inwardly directed air flow.

10 Claims, 5 Drawing Sheets

(51) Int. Cl.
*H02K 5/20* (2006.01)
*H02K 1/27* (2006.01)
*H02K 1/22* (2006.01)
*H02K 3/52* (2006.01)
*H02K 9/00* (2006.01)
*H02K 5/10* (2006.01)
*H02K 11/33* (2016.01)

(52) U.S. Cl.
CPC .............. *H02K 9/005* (2013.01); *H02K 11/33* (2016.01); *H02K 1/2706* (2013.01); *H02K 1/32* (2013.01); *H02K 5/20* (2013.01)

(58) Field of Classification Search
CPC .. H02K 9/06; H02K 9/00; H02K 9/02; H02K 9/08; H02K 5/20; H02K 9/005; H02K 11/33; F04D 29/328; F04D 29/384; F04D 29/386
USPC ........ 310/60 R, 59, 61, 62, 63, 216.014, 52, 310/68 R, 68 D; 416/179, 180, 181, 182, 416/183, 184, 185, 186 R, 187, 192, 235, 416/237; 415/58.6, 149.3, 149.4
See application file for complete search history.

(56) References Cited

U.S. PATENT DOCUMENTS

| | | | |
|---|---|---|---|
| 3,227,902 A | 1/1966 | Laing | |
| 7,923,871 B2 | 4/2011 | Weiss | |
| 2005/0040714 A1 | 2/2005 | Buening et al. | |
| 2006/0181162 A1 | 8/2006 | Pierret et al. | |
| 2009/0142203 A1* | 6/2009 | De Filippis | F04D 25/082 417/353 |
| 2009/0267426 A1* | 10/2009 | Graner | H02K 3/24 310/54 |
| 2010/0289352 A1* | 11/2010 | Takechi | H02K 11/048 310/64 |

FOREIGN PATENT DOCUMENTS

| | | |
|---|---|---|
| DE | 10249190 A1 | 5/2004 |
| DE | 102006015064 A1 | 10/2007 |
| DE | 602004012787 T2 | 4/2009 |
| JP | 02219447 H | 9/1990 |
| JP | 2008115790 | 5/2008 |
| KR | 1020020040038 A | 5/2002 |

* cited by examiner

BREATHING ELECTRIC MOTOR

CROSS-REFERENCE TO RELATED APPLICATION

This is a continuation application, under 35 U.S.C. §120, of copending international application No. PCT/EP2012/003575, filed Aug. 24, 2012, which designated the United States; this application also claims the priority, under 35 U.S.C. §119, of German patent application No. DE 10 2011 115 455.1, filed Sep. 12, 2011; the prior applications are herewith incorporated by reference in their entirety.

BACKGROUND OF THE INVENTION

Field of the Invention

The invention relates to an electric motor, in particular to a self-cooled brushless electric motor.

An electric motor usually contains a rotor which is mounted such that it can rotate in relation to a stationary stator. In a brushless electric motor, the stator is often equipped with a rotating-field winding by which a magnetic rotating field is generated—by an alternating current being applied to the rotating-field winding. In a usual configuration, the rotor, which is often arranged within the stator, is fitted with permanent magnets which generate an excitation field which interacts with the rotating field of the stator.

In a brushless electric motor, the alternating current which is provided for feeding the stator winding is usually generated by a converter electronics system (also called converter for short in the text which follows). In relatively small electric motors, the converter, together with an associated control electronics system, is often accommodated in an electronics compartment which is integrated in the motor housing.

A considerable amount of heat is produced during operation of an electric motor of this kind owing to switching losses in the converter. Additional heat is produced in the interior of the motor owing to the electrical losses, in particular as a result of the induced circulating currents and also due to mechanical friction. This development of heat leads to severe heating of the electric motor. In order to prevent the motor from overheating, relatively small electric motors are often provided with a self-cooling arrangement in which the electric motor is cooled by an air stream which is generated by the motor itself. An electric motor of this kind is configured in such a way that the rotor either drives a motor fan or—as a result of its structure being configured in a corresponding manner—generates the air stream itself.

It is disadvantageous that the cooling performance of a self-cooled electric motor of this kind is often highly dependent on the rotation direction of the rotor. This leads to different types of motor regularly being developed and produced for applications with different main rotation directions, this leading to comparatively high development, production and storage costs.

In addition, conventional electric motors with self-cooling often have a comparatively poor and non-uniform cooling performance, and this can lead to local overheating and accordingly to the electric motor having a low level of loadability.

SUMMARY OF THE INVENTION

The invention is based on the object of specifying an electric motor with efficient self-cooling using simple measures.

According to the invention, the electric motor contains a rotor which is mounted such that it can rotate in relation to a stator. Air-guiding contours which generate an air stream for the purpose of cooling the electric motor when the rotor is rotating are formed on at least one of the end faces of the rotor. In this case, the end faces are those faces of the rotor which are oriented transverse to the motor axis (that is to say the rotation axis of the rotor).

According to the invention, that end face which is fitted with the air-guiding contours is divided into at least two partial segments, wherein a first air-guiding contour is formed on the first partial segment of the end face, and a second air-guiding contour is formed on the second partial segment of the end face. In this case, the first air-guiding contour is formed in such a way that it generates an outwardly directed air stream when the rotor rotates in a reference rotation direction, while the second air-guiding contour is configured in such a way that it generates an inwardly directed air stream when the rotor rotates in the reference rotation direction.

Since, during rotation of the rotor, the first partial segment and the second partial segment alternately pass by each stationary point in the periphery of the end face, the air flow which is caused by the air-guiding contours also continuously changes its direction. Therefore, from the view of a stationary (that is to say non-rotating) observer, an oscillating, radial air stream which resembles a breathing process is generated by the rotor.

As a result of the continuous change in direction of the air flow, firstly particularly good eddying of the air which is contained in the interior of the motor is achieved, this effectively counteracting the formation of severe temperature gradients in the interior of the rotor, in particular the formation of local overheating zones. Furthermore, as a result of the oscillating radial flow, short flow paths are created, the flow paths allowing heat to be dissipated from the interior of the motor in a particularly efficient manner.

In addition, an electric motor with a high degree of invariance in the rotation direction in respect of the cooling performance is provided by the alternating arrangement of air-guiding contours, which act in opposite directions to one another, on the end face of the rotor. In other words, the motor is cooled in the same or at least similarly efficient manner both when the rotor rotates in the reference rotation direction and when the rotor rotates against the reference rotation direction, especially since the effect of the air-guiding contours likewise reverses when the rotation direction reverses. The air-guiding contour of the first partial segment, which air-guiding contour generates an outwardly directed air stream when the rotor rotates in the reference rotation direction, therefore generates an inwardly directed air stream when the rotor rotates against the reference rotation direction. Similarly, the air-guiding contour of the second partial segment of the end face, which air-guiding contour generates an inwardly directed air stream when the rotor rotates in the reference rotation direction, also generates an outwardly directed air stream when the rotor rotates against the reference rotation direction. Therefore, the air-guiding contours swap only their task or effect when the rotor rotation direction changes, whereas the cooling principle which is based on the generation of an oscillating radial flow is uninfluenced by the rotation direction of the rotor. Therefore, the "reference rotation direction" introduced above can be freely defined in the electric motor according to the invention. Here and below, it is used only as a reference variable in order to be able to precisely compare the effect of the first and second air-guiding contours.

Within the scope of the invention, that end face of the rotor which is fitted with the air-guiding contours can be divided, in principle, into any desired number of "first" and "second" partial segments with "first" and, respectively, "second" air-guiding contours arranged on each of them, wherein "first" and "second" partial segments are arranged in an alternating manner around the circumference of the end face. However, in order to achieve as high an air conversion rate as possible—in particular in a comparatively small and rapidly rotating electric motor—the end face is preferably divided into only two partial segments, specifically precisely one first partial segment and precisely one second partial segment. In this case, the two partial segments are preferably formed by two (semicircular) half-segments of the end face, which half-segments are of the same size and butt directly against one another along a radial line.

In order to achieve complete or at least virtually complete rotation direction invariance of the electric motor, the first air-guiding contour is preferably configured with mirror-image symmetry in relation to the second air-guiding contour. In this case, the mirror plane is, in particular, an axial/radial plane which is spanned by the direction of the motor axis and a radial line of the rotor, which radial line separates the first partial segment and the second partial segment.

In one advantageous embodiment of the invention, the first air-guiding contour and the second air-guiding contour are each formed by a number of elongate webs. In this case, the webs project from the end face of the rotor in the axial direction and (in respect of their longitudinal extent) in each case extend obliquely to the local radials of the end face, that is to say to the radial direction of the end face at the location of the respective web. On account of this orientation, the webs act virtually as guide vanes which deflect the surrounding air inward or outward when the rotor rotates. In this case, the phrase "a number of webs" is to be understood in the sense that the first air-guiding contour and/or the second air-guiding contour can, in the extreme case, also contain only in each case a single web, but that each of the two air-guiding contours is generally in each case formed from a plurality of webs.

If the first and/or second air-guiding contour contain/contains a plurality of webs, all of the webs of the respective air-guiding contour are preferably set (that is to say obliquely oriented) to the same degree in relation to the respectively local radial direction.

In addition to the webs which form the air-guiding contours, further webs which extend in the radial direction are preferably provided on the end face of the rotor. In this case, radial webs of this kind delimit, in particular, the first and second partial segments of the end face from one another. Furthermore, each of these partial segments is preferably also divided into a plurality of subsegments by at least one further radial web (but preferably in each case three further radial webs). In this case, in each case one web of the first air-guiding contour or the second air-guiding contour is expediently arranged in each of the subsegments. The radial webs promote a tangential component of the air stream which is generated by the rotor and therefore amplify the eddying of air which is caused by the air-guiding contours. They also mechanically reinforce the rotor.

For the purpose of effective channeling of the air stream which is generated by the rotor, a mating air-guiding contour is formed on a mating face of a (motor) housing part in an advantageous further development of the invention. In this case, the "mating face" is that face of the housing part which is situated immediately opposite that end face of the rotor which is fitted with the air-guiding contours. The mating air-guiding contour is formed, in particular, by a number of webs—which run predominantly at least approximately in the radial direction—with slots arranged between the webs. In this case, each slot preferably ends in a ventilation opening at the circumference of the mating face, the interior of the motor forming fluidic connection with the environment by virtue of the ventilation opening.

In particular, an electronics compartment for accommodating a converter electronics system for feeding the electric motor is made in the housing part which adjoins the end face.

The electric motor according to the invention is preferably configured as an internal rotor motor and, in the preferred application, is used, in particular, as a fan motor for driving a radiator fan in a motor vehicle.

Other features which are considered as characteristic for the invention are set forth in the appended claims.

Although the invention is illustrated and described herein as embodied in breathing electric motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings (examples).

DETAILED DESCRIPTION OF THE INVENTION

Figure 1:
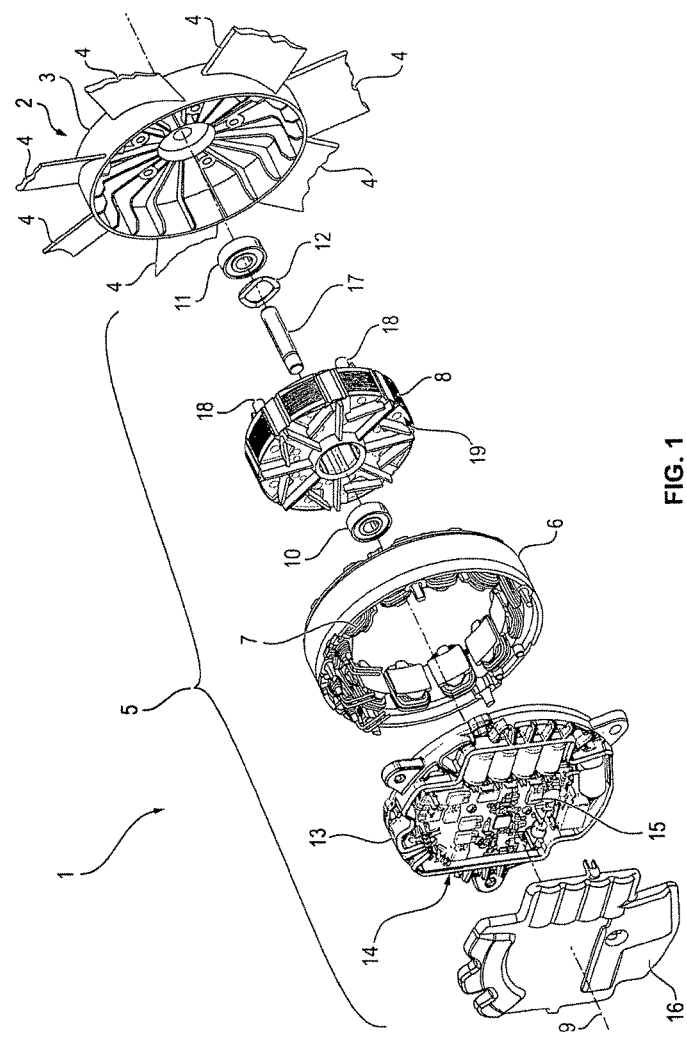
FIG. 1 is a diagrammatic, exploded, perspective view of a radiator fan for a motor vehicle having a self-cooled, brushless internal rotor motor with an integrated converter electronics system according to the invention.

Mutually corresponding parts and variables are always provided with the same reference symbols throughout the figures. Referring now to the figures of the drawing in detail and first, particularly, to FIG. 1 thereof, there is shown a fan 1 for a radiator of a motor vehicle in an exploded state. The fan 1 contains a fan impeller 2 with a central cap 3, seven air-guiding vanes 4 (which are illustrated only in a rudimentary manner) being arranged in a uniformly distributed manner around the outer circumference of the central cap. The fan 1 further contains a (fan) motor 5 by which the fan impeller 2 is driven in rotation.

The motor 5 contains a stator 6—which is hollow-cylindrical in simplified form—which is wound with a three-phase rotating-field winding 7. The motor 5 further contains a permanent-magnet rotor 8—which is in the form of a circular disk in simplified form—which is mounted in the interior of the stator 6 such that it can rotate about a motor axis 9. In order to mount the rotor 8, the motor 5 contains two roller bearings 10 and 11 which engage on the rotor 8 from axially opposite sides. The axial play of the rotor 8 between the two roller bearings 10 and 11 is sprung by a spring ring 12 in this case.

The motor 5 further contains a—highly simplified—disk-like motor support 13. An electronics compartment 14, into which a converter electronics system 15 is inserted, is made in the motor support 13 at an end which is averted from the fan impeller 2. In order to close the electronics compartment 14 in a sealed manner, the motor 5 finally contains an electronics compartment cover 16.

That side of the fan 1 on which the fan impeller 2 is arranged is referred to as the "front" or "front face", irrespective of the orientation of the fan 1 in space. In contrast, that side of the fan 1 which is averted from the front side and is closed by the electronics compartment cover 16 is referred to as the "rear" or "rear side". Accordingly, the terms "rear" and "front" and also "rear side" and "front side" are also used for the individual parts of the fan 1, wherein the orientation of these parts in the assembled fan 1 is the starting point in this respect.

The rotor 8 is formed (in a manner which is not illustrated in more detail) by a laminated core into which permanent magnets for generating an excitation field are inserted, wherein the laminated core, together with the inserted permanent magnets, is encapsulated with a plastic casing. In a similar way, the stator 6 also contains a laminated core which is encapsulated with a plastic casing. In the illustrated example, the motor support 13 is formed by an integral aluminum diecast part. The electronics compartment cover 16 is preferably a plastic injection-molded part.

Figure 2:
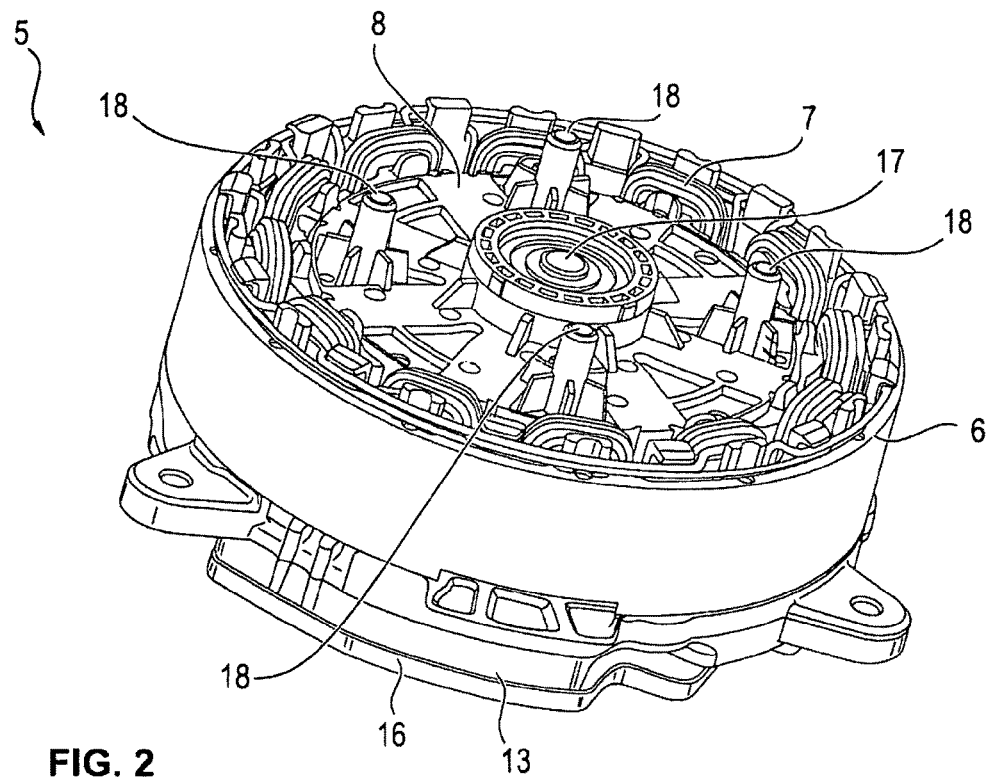
FIG. 2 is a perspective view looking at a front side of the assembled motor according to FIG. 1.
Figure 3:
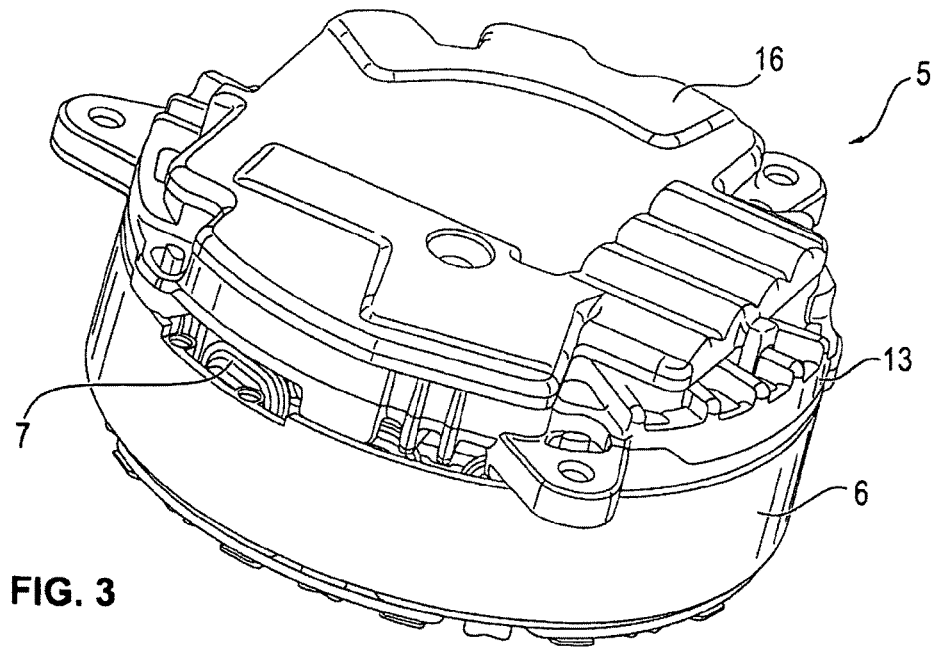
FIG. 3 is a perspective view looking at a rear side of the assembled motor according to FIG. 1.
Figure 4:
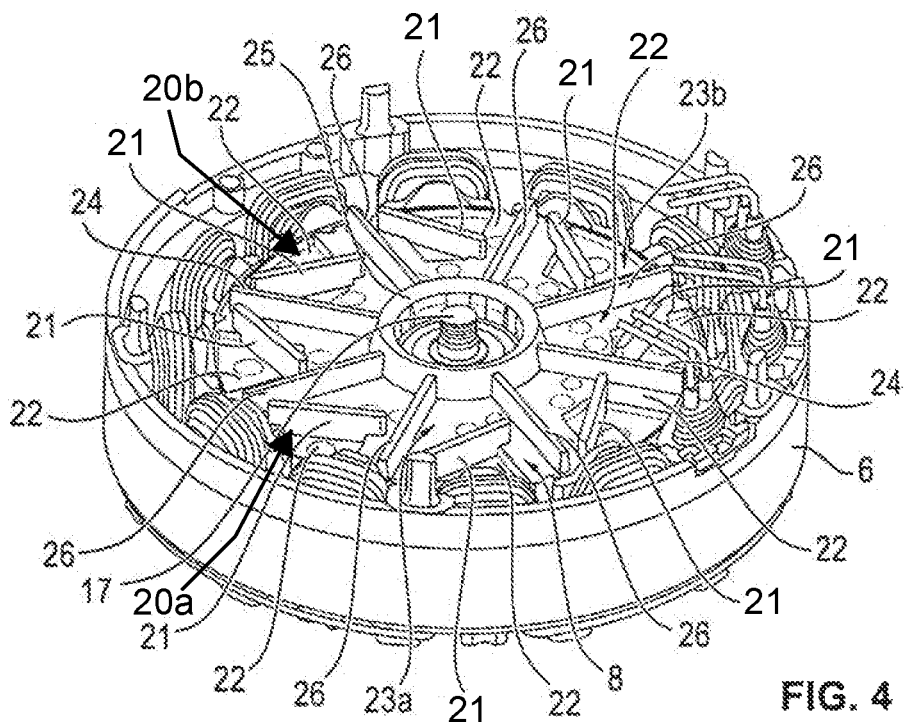
FIG. 4 is a perspective view looking at a rear side of a stator and also a rotor of the motor according to FIG. 1, which rotor is situated in the stator.
Figure 5:
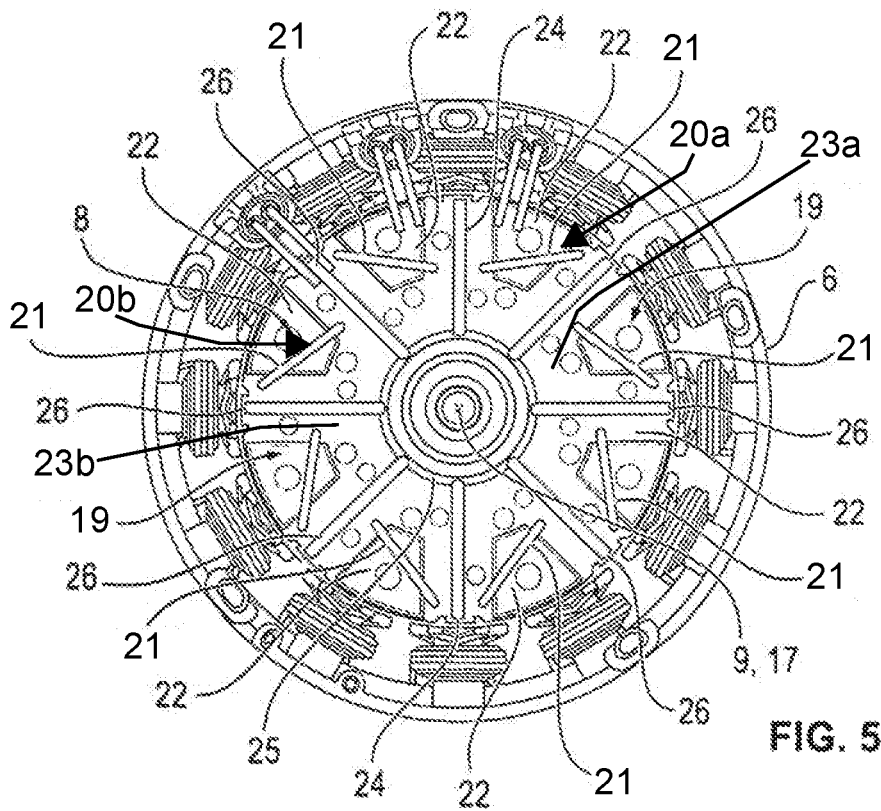
FIG. 5 is a plan view of the rear side of the stator and the rotor of the motor according to FIG. 1, which rotor is situated in the stator.
Figure 6:
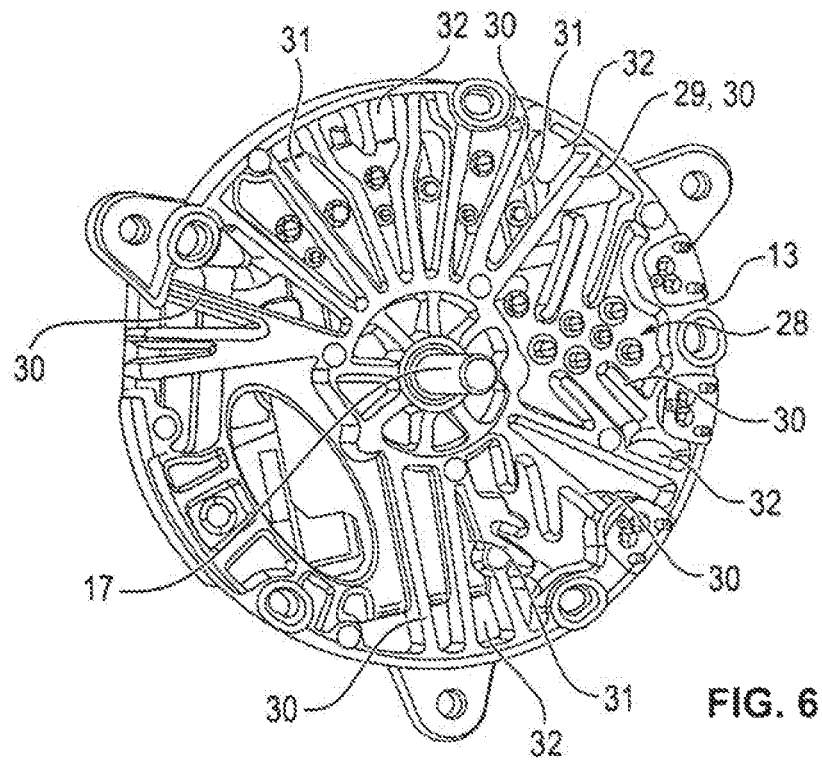
FIG. 6 is a perspective view looking at a front side of a motor support of the motor according to FIG. 1.
Figure 7:
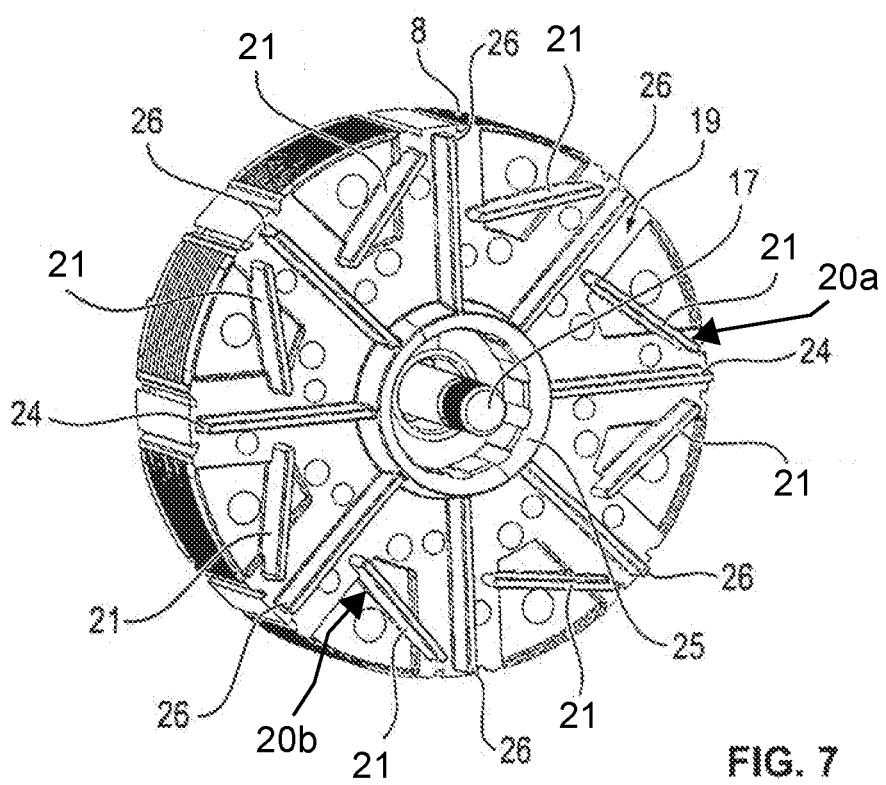
FIG. 7 is a perspective view looking at a rear side of the rotor of the motor according to FIG. 1.
Figure 8:
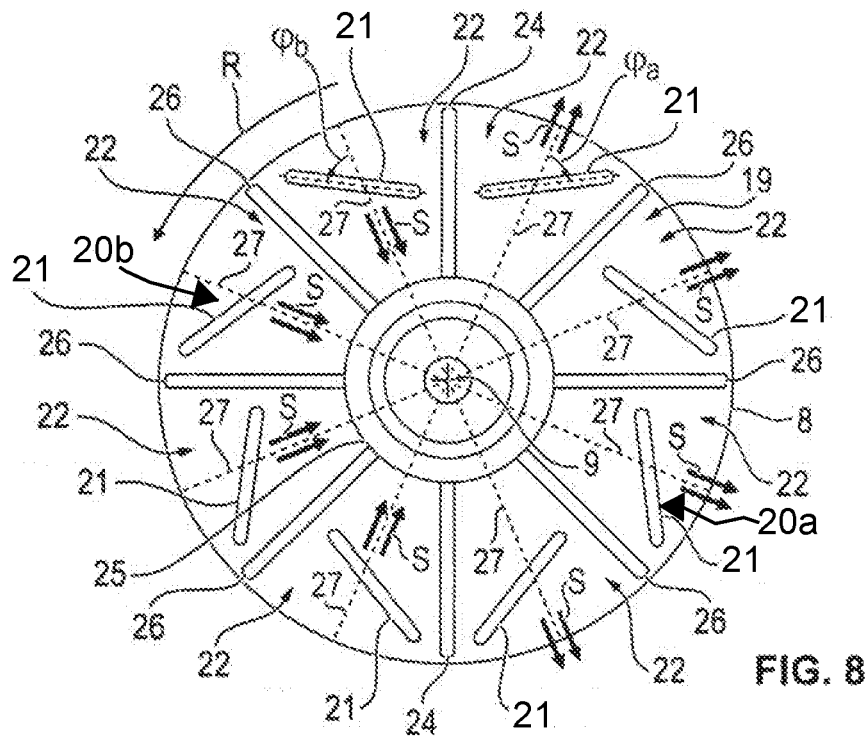
FIG. 8 is a schematic illustration of the effect of the rotor for self-cooling of the motor when the rotor rotates in a reference rotation direction.

In the assembled state of the motor 5 which is shown in FIGS. 2 and 3, the stator 6 is firmly attached to the front side of the motor support 13. The rotor 8 is inserted into the stator 6. The motor support 13 therefore forms, together with the stator 6, a motor housing in which the rotor 8 is accommodated. In the installed state, the rotor 8 is flanked on both axial sides by in each case one of the two roller bearings 10 and 11. In this case, the roller bearings 10 and 11 are mounted on an axle pin 17 which, for its part, is fastened to the motor support 13 (compare FIG. 6). The front side of the rotor 8 is provided with four screw bosses 18 by which the rotor 8 is screwed to the fan impeller 2 in the mounted state. The motor 5 and therefore the entire fan 1 are fastened to the vehicle by the motor support 13 which, for this purpose, is provided with three screw lugs which project from its outer circumference.

The motor 5 is a self-cooled electric motor. In the motor 5, a particular cooling requirement is made, in particular, of the front side of the motor support 13, especially since a considerable proportion of the lost heat which is generated by the converter electronics system 15 is dissipated from the electronics compartment 14 by the front side.

In order to achieve an efficient cooling effect at this point, two air-guiding contours 20a and 20b are mounted on an adjoining rear-side end face 19 of the rotor 8, the air-guiding contours being shown in FIGS. 4 to 9 in particular. Each of the two air-guiding contours 20a and 20b contain in each case four elongate, rectilinear webs 21 which are formed from the plastic casing of the rotor 8 in such a way that they project from the end face 19 of the rotor 8 toward the motor support 13 in the axial direction.

A total of eight webs 21 of the air-guiding contours 20a and 20b are arranged in an approximately uniformly distributed manner around the circumference of the end face 19. Therefore, each web 21 is arranged within a subsegment 22 of the circular disk-like end face 19 which corresponds to an eighth of or a 45° area of a circle. The four webs 21 of the air-guiding contour 20a are arranged in four immediately adjacent subsegments 22 in this case, with the result that the entire air-guiding contour 20a extends over a half-segment 23a (or 180° segment) of the end face 19. The four webs 21 of the air-guiding contour 20b are also likewise arranged in four immediately adjacent subsegments 22, with the result that the entire air-guiding contour 20b includes the remaining second half-segment 23b of the end face 19. In this case, the two half-segments 23a and 23b of the end face 19 are delimited from one another by two radial webs 24 which are formed from the plastic casing of the rotor 8 as axial projections and which extend outward diametrically in relation to one another starting from a central circular web 25. Furthermore, the subsegments 22 of each half-segment 23a, 23b are separated from one another by in each case three further radial webs 26 of the same kind. The radial webs 24 and 26 therefore form a star-shaped or sun-shaped structure together with the circular web 25. In addition, each web 21 is surrounded on three sides by two radial webs 26 and, respectively, 24 and 26 and the circular web 25.

The four webs 21 of the air-guiding contour 20a are always set in an oblique manner (that is to say at an acute setting angle $\phi_a$) in relation to that radial 27 (FIG. 8) which forms the angle bisector of the respectively associated subsegment 22 and therefore intersects the respective web 21 approximately in the center. Similarly, the four webs 21 of the air-guiding contour 20b are likewise always set in an oblique manner, specifically at an acute setting angle $\phi_b$, in relation to the radial 27 which forms the angle bisector of the respectively associated subsegment 22.

In this case, the setting angles $\phi_a$ and $\phi_b$ have the same absolute magnitude. However, the webs 21 of the air-guiding contour 20a differ from the webs 21 of the air-guiding contour 20b in respect of the setting direction. While specifically the webs 21 of the air-guiding contour 20a are deflected in the clockwise direction in relation to the respectively associated radial 27, the webs 21 of the air-guiding contour 20b are oriented in the counterclockwise direction with respect to the respectively associated radial 27. Accordingly, the setting angle $\phi_a$ has a negative magnitude, while the setting angle $\phi_b$ has a positive magnitude. As a result of the oppositely directed, yet identical, setting of the respective webs 21, the air-guiding contours 20a and 20b together form a pattern which has mirror-image symmetry in respect of the axial/radial plane which is defined by the radial webs 24, and therefore by the separating line of the half-segments 23a and 23b.

The absolute magnitude of the setting angle $\phi_a$ and $\phi_b$ can be suitably selected approximately between 40° and 80°. The dimensions $\phi_a = -60°$ and $\phi_b = +60°$ have proven particularly advantageous for efficient cooling for the fan motor 5 which is illustrated in the figures.

In the assembled state of the motor 5, the front side of the motor support 13 is situated immediately opposite the end face 19 of the rotor 8 and therefore forms a mating face 28 (FIG. 6) to the end face 19. In a manner corresponding to the air-guiding contours 20a, 20b, a mating air-guiding contour 29 is formed on the mating face 28, the mating air-guiding contour being formed from a plurality of webs 30—which run radially at least in rough approximation—and slots 31 which are formed between the webs. In this case, at least the major proportion of the slots 31 opens out into in each case at least one ventilation opening 32 at the circumference of the motor support 13, the interior space which is surrounded by the stator 6 forming a fluidic connection with the surrounding area by the ventilation openings when the motor 5 is in the mounted state. As a result, the slots 31 act as air ducts which allow air to be exchanged in a targeted manner between the interior of the motor and the surrounding area.

The air-guiding contours 20a, 20b of the rotor 8 efficiently promote this exchange of air during operation of the rotor 5 by generating a radial air flow S (FIG. 8), which however is always directed in opposite directions for the two air-guiding contours 20a, 20b, as a result of their oblique setting when the rotor 8 rotates. Therefore, the air flow S is generated in the radially outward direction by the webs 21 of the air-guiding contour 20a, while the air flow S is generated in the radially inward direction by the webs 21 of the air-guiding contour 20b, when the rotor 8 rotates in a reference rotation direction R (in this case defined as rotation of the rotor 8, which is viewed from the rear, in the counterclockwise direction).

Therefore, an oscillating air stream is generated at each ventilation opening 32 in the motor support 13 by the rotating rotor 8 since air is expelled through the respective ventilation opening 32 with each first half-rotation of the rotor 8, while air is drawn in through the same ventilation opening 32 with each second half-rotation of the rotor 8. In the figurative sense, the motor 5 therefore performs a "breathing process" which results in efficient dissipation of heat from the interior of the motor and therefore efficient cooling of the motor support 13.

Figure 9:
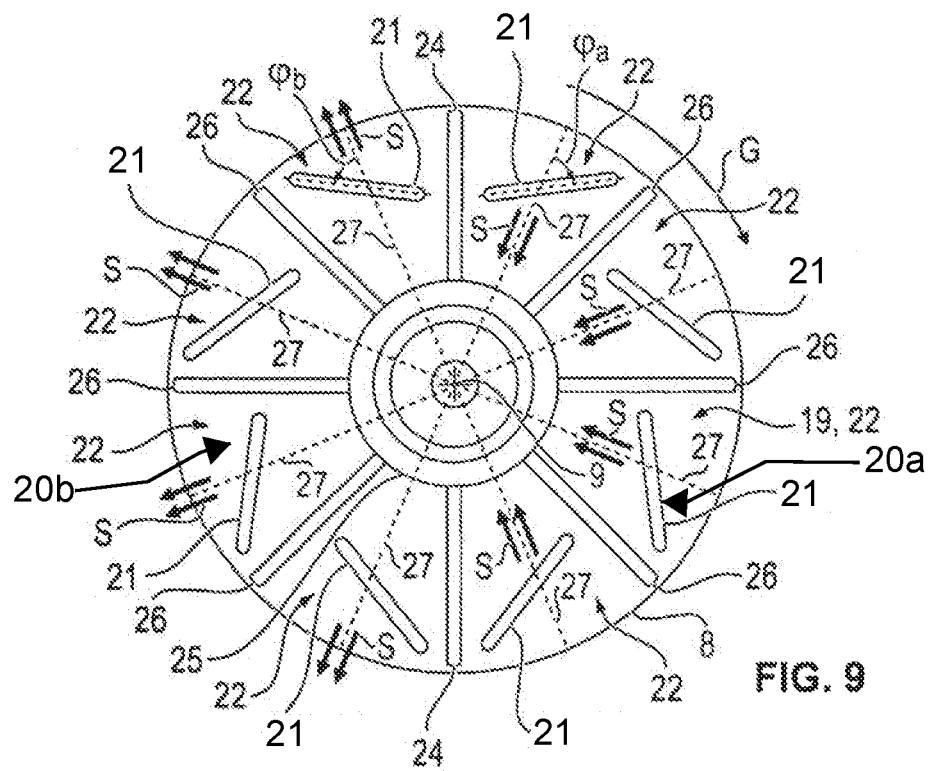
FIG. 9 is an illustration according to FIG. 8, the effect of the rotor for self-cooling of the motor when the rotor rotates counter to the reference rotation direction.

The flow conditions are reversed in accordance with FIG. 9 when the rotor 8 rotates in a direction G which is opposite to the reference rotation direction R. However, when considered over a full rotation of the rotor 8, the oscillating air flow remains totally uninfluenced by the reversal in the rotation direction on account of the mirror-symmetrical configuration of the air-guiding contours 20a, 20b. As a result, the rotor 5 has an equally efficient cooling effect in both rotation directions.

The invention claimed is:

1. An electric motor, comprising:
   a stator;
   a rotor mounted such that said rotor can rotate in relation to said stator, said rotor having an end face with a first partial segment and a second partial segment, said first partial segment and said second partial segment being each formed by a half-segment of said end face;
   a first air-guiding contour generating an outwardly directed air stream when said rotor rotates in a reference rotation direction, and formed on said first partial segment of said end face of said rotor;
   a second air-guiding contour generating an inwardly directed air stream when said rotor rotates in the reference rotation direction, and formed on said second partial segment of said end face;
   a motor housing having a housing part with at least one ventilation opening formed therein, said housing part being disposed opposite to said end face of said rotor; and
   during rotation of said rotor, an overall air stream produced by said first and second air-guiding contours is oscillating at said ventilation opening since air is expelled through said ventilation opening with each first half-rotation of said rotor, while air is drawn in through said ventilation opening with each second half-rotation of said rotor.

2. The electric motor according to claim 1, wherein said first air-guiding contour is configured with mirror-image symmetry in relation to said second air-guiding contour.

3. The electric motor according to claim 1, wherein said first air-guiding contour and said second air-guiding contour each have a number of elongate webs which project from said end face in an axial direction and which in each case extend obliquely on said end face.

4. The electric motor according to claim 3, wherein all of said elongate webs of said first air-guiding contour and/or all of said elongate webs of said second air-guiding contour are set to a same degree in relation to said end face of said rotor.

5. The electric motor according to claim 3, wherein said rotor has radial webs projecting from said end face in an axial direction, said first partial segment and said second partial segment are separated by said radial webs.

6. The electric motor according to claim 5, wherein said rotor has further radial webs, said first partial segment and said second partial segment are separated into subsegments in each case by at least one of said further radial webs.

7. The electric motor according to claim 6, wherein in each case one of said elongate webs of either said first air-guiding contour and, respectively, of said second air-guiding contour is disposed in each of said subsegments of said first partial segment and of said second partial segment.

8. The electric motor according to claim 1, wherein said housing part having a mating face and ventilation openings formed therein, said mating face having a mating air-guiding contour having webs and slots formed therein disposed between said webs, said mating face adjoining said end face, and each of said slots opening out into one of said ventilation openings on a circumference of said mating surface.

9. The electric motor according to claim 8, further comprising an electronics compartment for accommodating a converter electronics system disposed in said housing part which adjoins said end face.

10. The electric motor according to claim 5, wherein said rotor has further radial webs, said first partial segment and said second partial segment are separated into subsegments in each case by three of said further radial webs.

* * * * *